United States Patent
Shieh et al.

(10) Patent No.: US 7,463,689 B2
(45) Date of Patent: Dec. 9, 2008

(54) ERROR CORRECTION AND DECODING METHOD AND SYSTEM FOR WIDEBAND CODE DIVISION MULTIPLE ACCESS

(75) Inventors: Shin-Lin Shieh, Fujan (CN); Chun-Ming Kuo, Taipei County (TW)

(73) Assignee: Industrial Technology Research Institute, Hsinchu (TW)

(*) Notice: Subject to any disclaimer, the term of this patent is extended or adjusted under 35 U.S.C. 154(b) by 754 days.

(21) Appl. No.: 10/681,164

(22) Filed: Oct. 9, 2003

(65) Prior Publication Data

US 2005/0078738 A1    Apr. 14, 2005

(51) Int. Cl.
H04L 27/00 (2006.01)
H04L 1/12 (2006.01)

(52) U.S. Cl. ........................ 375/259; 370/252

(58) Field of Classification Search ......... 379/259–262, 379/316, 295, 130, 140, 141, 146, 147; 370/320, 370/335, 342, 441, 241, 252; 455/39; 714/794, 714/699
See application file for complete search history.

(56) References Cited

U.S. PATENT DOCUMENTS

| | | | |
|---|---|---|---|
| 6,341,125 B1 * | 1/2002 | Hong et al. | 370/335 |
| 6,490,461 B1 * | 12/2002 | Müller | 455/522 |
| 6,778,612 B1 * | 8/2004 | Lozano et al. | 375/299 |
| 2002/0013926 A1 * | 1/2002 | Kim et al. | 714/781 |
| 2002/0041640 A1 * | 4/2002 | Le Bars et al. | 375/340 |
| 2002/0090024 A1 * | 7/2002 | Tan | 375/146 |
| 2003/0035467 A1 * | 2/2003 | Shimizu | 375/147 |
| 2003/0063681 A1 * | 4/2003 | Olivier | 375/265 |
| 2004/0264454 A1 * | 12/2004 | Rajkumar et al. | 370/389 |

* cited by examiner

Primary Examiner—Mohammad Ghayour
Assistant Examiner—Vineeta S Panwalkar
(74) Attorney, Agent, or Firm—Finnegan, Henderson, Farabow, Garrett & Dunner LLP (57) ABSTRACT

A communications system including a base station and a mobile unit wherein a size of information bits is negotiated between the base station and the mobile unit, an encoder encoding the information bits according to Reed-Muller codes, and a permuter permuting the encoded information bits. The information bits are transmitted between the base station and the mobile unit with the negotiated size. The communications system according to the present invention further comprises a depermuter depermuting the transmitted information bits, a transformer transforming the depermuted information bits with a reduced order determined according to the negotiated size, and a maximum likelihood (ML) decoder decoding the transmitted information bits.

18 Claims, 6 Drawing Sheets

ERROR CORRECTION AND DECODING METHOD AND SYSTEM FOR WIDEBAND CODE DIVISION MULTIPLE ACCESS

FIELD OF THE INVENTION

The present invention generally relates to wireless communications and, more particularly, to error correction and decoding in wideband code division multiple access (WCDMA).

BACKGROUND OF THE INVENTION

Wideband code division multiple access or WCDMA is a widely used standard in wireless communications. In sending data or information bits between a base station and a mobile unit (such as a cellular phone, notebook or personal computer with an wireless interface, wireless personal digital assistant or PDA), the information bits are encoded as they are transmitted and decoded as they are received. Computation-intensive encoding and decoding, such as Reed-Muller coding, are particularly significant in ensuring the accuracy and congruence of the transmitted and received information bits. In WCDMA, the information bits are transmitted in a series of frames. Distribution of frame resources for the encoding and decoding is critical in optimally inducing transmission performance.

There is thus a general need in the art for a method and system of WCDMA encoding and decoding overcoming at least the aforementioned shortcomings in the art. A particular need exists in the art for an optimal method and system for Reed-Muller encoding and decoding with reduced computation complexity.

SUMMARY OF THE INVENTION

Accordingly, a preferred embodiment of the present invention is directed to a personal authentication device, method and system that obviate one or more of the problems due to limitations and disadvantages of the related art.

To achieve these and other advantages, and in accordance with the purpose of the invention as generally embodied and broadly described, there is provided a communications method comprising the steps of communicating between a base station and a mobile unit, negotiating a size of information bits between the base station and the mobile unit, encoding the information bits according to a code, transmitting the encoded information bits with the negotiated size, transforming the encoded information bits with a reduced order determined according to the negotiated size, and decoding the transmitted information bits.

In one aspect, the communications method according to the invention utilizes maximum likelihood (ML) decoding, which further comprises the steps of generating correlation values for the transformed information bits, calculating at least one maximum value from the generated correlation values, and regenerating the negotiated size from the at least one maximum value.

In an additional aspect, the communications method according to the invention further comprises the steps of permuting the information bits and depermuting the transmitted information bits.

In a further aspect, the communications method according to the invention is implemented in wideband code division multiple access or WCDMA.

In another aspect, the information bits are encoded according to Reed-Muller codes.

In still another aspect, the negotiated size for the information bits further comprises a transport format combination index (TFCI).

In yet another aspect, the transmitted information bits are transformed with the reduced order using fast Hadamard transform.

Also in accordance with a further embodiment of the present invention, there is provided a communications method comprising the steps of communicating between a base station and a mobile unit, negotiating a size of information bits between the base station and the mobile unit, encoding the information bits according to Reed-Muller codes, permuting the encoded information bits, transmitting the encoded information bits with the negotiated size, depermuting the transmitted information bits, determining a reduced order according to the negotiated size, transforming the encoded information bits with the reduced order, and decoding the transmitted information bits.

In one aspect, the communications method according to the invention utilizes maximum likelihood (ML) decoding, which further comprises the steps of generating correlation values for the transformed information bits, calculating at least one maximum value from the generated correlation values, and regenerating the negotiated size from the at least one maximum value.

In a further aspect, the communications method according to the invention is implemented in wideband code division multiple access or WCDMA.

In another aspect, the negotiated size for the information bits further comprises a transport format combination index (TFCI).

In yet another aspect, the transmitted information bits are transformed with the reduced order using fast Hadamard transform.

Further in accordance with another preferred embodiment of the present invention, there is provided a communications system comprising a base station and a mobile unit wherein a size of information bits is negotiated between the base station and the mobile unit, an encoder encoding the information bits according to Reed-Muller codes, and a permuter permuting the encoded information bits. The information bits are transmitted between the base station and the mobile unit with the negotiated size. The communications system according to the present invention further comprises a depermuter depermuting the transmitted information bits, a transformer transforming the depermuted information bits with a reduced order determined according to the negotiated size, and a maximum likelihood (ML) decoder decoding the transmitted information bits.

In one aspect, the ML decoder of the communications system according to the present invention generates correlation values for the transformed information bits, calculates at lease one maximum value from the generated correlation values, and regenerates the negotiated size from the at least one maximum value.

In a further aspect, the transformer of communications system according to the present invention is a fast Hadamard transformer.

In another aspect, the communications system according to the present invention is a wideband code division multiple access or WCDMA system.

A particular advantage of the present invention is the optimal reduction of the search space required in matching the possible sets of the code words for the data being transmitted. In addition, the Reed-Muller decoding complexity is advantageously optimized according to the present invention by reducing the order of the fast Hadamard transform in transforming the information bits.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawing, which is incorporated in and constitutes a part of this specification, illustrates several embodiments of the invention and together with the description, serves to explain the principles of the invention.

DESCRIPTION OF THE EMBODIMENTS

Reference will now be made in detail to the present embodiment of the invention, an example of which is illustrated in the accompanying drawings. Wherever possible, the same reference numbers will be used throughout the drawings to refer to the same or like parts.

Figure 1:
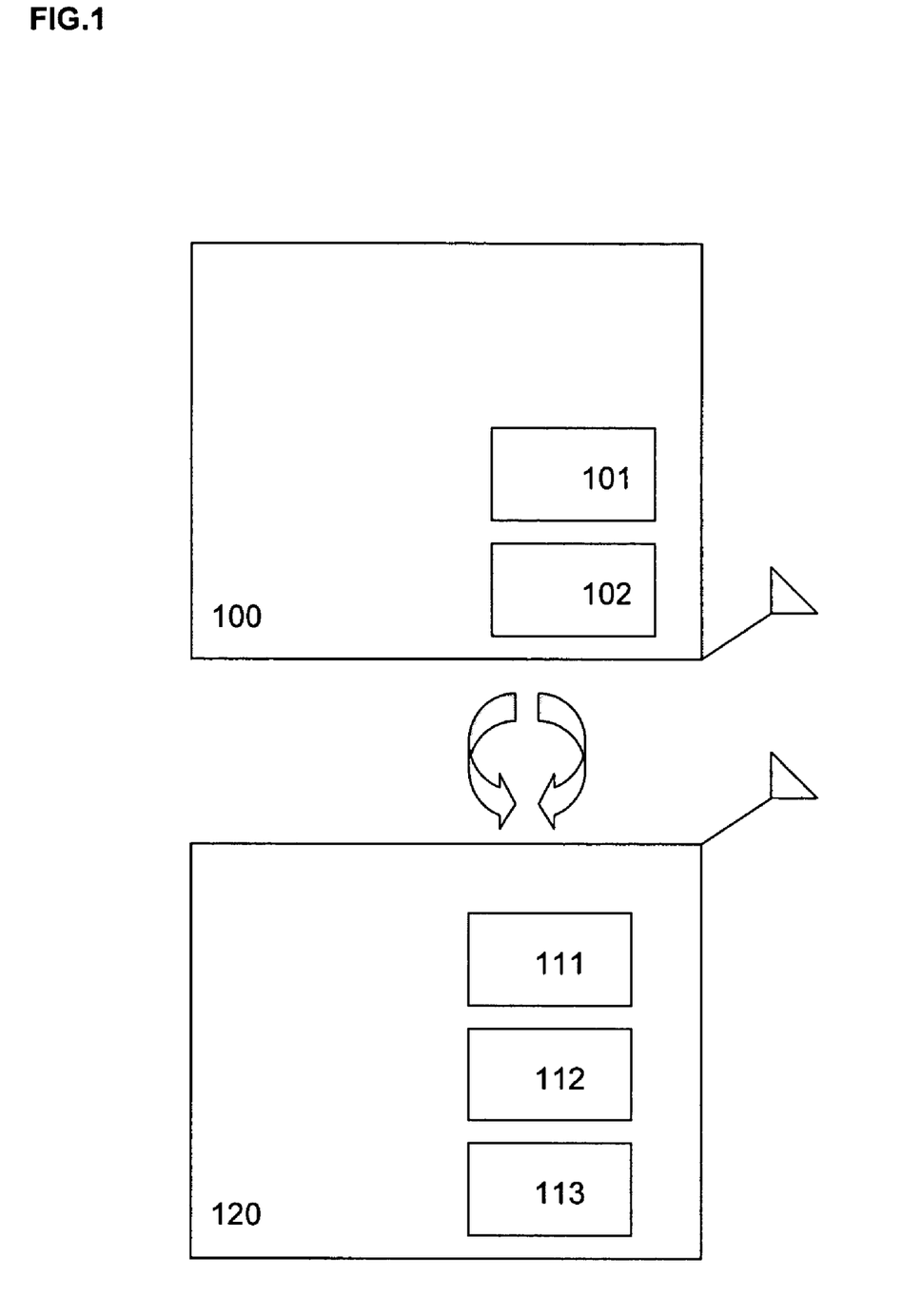
FIG. 1 is a block diagram exemplarily illustrating a communications system according to one embodiment of the present invention.

FIG. 1 is a block diagram of a communications system according to an embodiment of the present invention, not necessarily drawn to scale, in which the dimensions of various components may be arbitrarily increased or reduced. Referring to FIG. 1, there is provided a communications system (not numbered) comprising a base station 100 and a mobile unit 120 wherein a size of information bits is negotiated between the base station 100 and the mobile unit 120, an encoder 101 encoding the information bits according to Reed-Muller codes, and a permuter 102 permuting the encoded information bits. The mobile unit 120 can further comprise a wireless handset, notebook or personal computer (PC), personal digital assistant (PDA), cellular telephone or any device with a wireless interface such as a PC card. Information bits are transmitted between the base station 100 and the mobile unit 120 with the negotiated size. The communications system according to the present invention further comprises a depermuter 111 depermuting the transmitted information bits, a transformer 112 transforming the depermuted information bits with a reduced order determined according to the negotiated size, and a maximum likelihood (ML) decoder 113 decoding the transmitted information bits.

In one aspect, the ML decoder 113 of the communications system according to the present invention generates correlation values for the transformed information bits, calculates at least one maximum value from the generated correlation values, and regenerates the negotiated size from the at least one maximum value.

In a further aspect, the transformer 112 of communications system according to the present invention is a fast Hadamard transformer.

Figure 2:
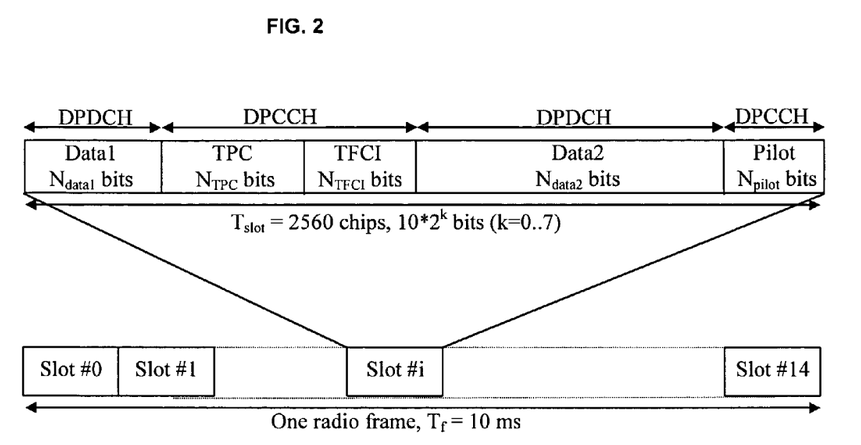
FIG. 2 is an exemplary frame structure in WCDMA having the TFCI information bits.

In an additional aspect, the communications system according to the present invention is a wideband code division multiple access or WCDMA system. Referring to the WCDMA system in particular, Reed-Muller (RM) codes are used for error correction in transport format combination index (TFCI) bits. FIG. 2 illustrates an exemplary frame structure in WCDMA having the TFCI information bits. Referring to FIG. 2, TFCI information bits inform the receiver of the instantaneous transport format combination of the transport channels in WCDMA, where the TFCI bits are decoded every radio frame having a period of 10 ms. If the TFCI bits are wrongly decoded, the data received at the receiver will be inaccurate. Error correcting RM codes are thus utilized in ensuring proper and accurate data transmission.

RM encoding and decoding generally require utilization of generating matrices in conjunction with the data being transmitted. An exemplary generating matrix of the $(2^m, m+1)$ first order Reed-Muller code, such as a (16, 5) matrix, is as follows:

$$G = \begin{bmatrix} 1 & 1 & 1 & 1 & 1 & 1 & 1 & 1 & 1 & 1 & 1 & 1 & 1 & 1 & 1 & 1 \\ 0 & 0 & 0 & 0 & 0 & 0 & 0 & 0 & 1 & 1 & 1 & 1 & 1 & 1 & 1 & 1 \\ 0 & 0 & 0 & 0 & 1 & 1 & 1 & 1 & 0 & 0 & 0 & 0 & 1 & 1 & 1 & 1 \\ 0 & 0 & 1 & 1 & 0 & 0 & 1 & 1 & 0 & 0 & 1 & 1 & 0 & 0 & 1 & 1 \\ 0 & 1 & 0 & 1 & 0 & 1 & 0 & 1 & 0 & 1 & 0 & 1 & 0 & 1 & 0 & 1 \end{bmatrix}$$

Referring specifically to the encoder 101 encoding the information bits, an exemplary binary message word m of 5 bits $[m_0\ m_1\ m_2\ m_3\ m_4]$ included in the data being transmitted can be encoded to code word C of 16 bits $[C_0\ C_1\ C_2\ \ldots\ C_{15}]$ as follows:

$$C = mG$$

$$= [m_0\ m_1\ m_2\ m_3\ m_4] \begin{bmatrix} 1 & 1 & 1 & 1 & 1 & 1 & 1 & 1 & 1 & 1 & 1 & 1 & 1 & 1 & 1 & 1 \\ 0 & 0 & 0 & 0 & 0 & 0 & 0 & 0 & 1 & 1 & 1 & 1 & 1 & 1 & 1 & 1 \\ 0 & 0 & 0 & 0 & 1 & 1 & 1 & 1 & 0 & 0 & 0 & 0 & 1 & 1 & 1 & 1 \\ 0 & 0 & 1 & 1 & 0 & 0 & 1 & 1 & 0 & 0 & 1 & 1 & 0 & 0 & 1 & 1 \\ 0 & 1 & 0 & 1 & 0 & 1 & 0 & 1 & 0 & 1 & 0 & 1 & 0 & 1 & 0 & 1 \end{bmatrix}$$

$$= [c_0\ c_1\ c_2\ \cdots\ c_{15}]$$

For instance, if $m_9$=[01001] is RM encoded, the resulting code word will be $C_9$=[0101010110101010]. Additional exemplary generating matrices for RM coding are illustrated below in tabular form, such as the (32, 10) TFCI generating matrix in Table 2, the (32, 6) TFCI generating matrix in Table 3, the (16, 5) TFCI generating matrix in Table 4, and another (16, 5) TFCI generating matrix in Table 5.

TABLE 2

(32, 10) Generating Matrix $$G_{S32} = \begin{bmatrix} 10101010101011010101010101010100 \\ 01100110011001101100110011001100 \\ 00011110000111100011110000111100 \\ 00000001111111100000001111111100 \\ 00000000000000011111111111111101 \\ 11111111111111111111111111111111 \\ 01010000110001111100000111011101 \\ 00000111001101110110111100011100 \\ 00010101111100100110100010101100 \\ 00111000011011101011110101000100 \end{bmatrix}$$

TABLE 3

(32, 10) Generating Matrix $$G_{32} = \begin{bmatrix} 11111111111111111111111111111111 \\ 00000000000000001111111111111111 \\ 00000000111111110000000011111111 \\ 00000001111111100000001111111100 \\ 00011110000111100001111000011110 \\ 00110011001100110011001100110011 \\ 01010101010101010101010101010101 \end{bmatrix}$$

TABLE 4

(16, 5) Generating Matrix $$G_{S16} = \begin{bmatrix} 1 & 0 & 1 & 0 & 1 & 0 & 1 & 0 & 1 & 0 & 1 & 0 & 1 & 0 & 1 & 0 \\ 0 & 1 & 1 & 0 & 0 & 1 & 1 & 0 & 0 & 1 & 1 & 0 & 0 & 1 & 1 & 0 \\ 0 & 0 & 0 & 1 & 1 & 1 & 1 & 0 & 0 & 0 & 0 & 1 & 1 & 1 & 1 & 0 \\ 0 & 0 & 0 & 0 & 0 & 0 & 0 & 1 & 1 & 1 & 1 & 1 & 1 & 1 & 1 & 0 \\ 1 & 1 & 1 & 1 & 1 & 1 & 1 & 1 & 1 & 1 & 1 & 1 & 1 & 1 & 1 & 1 \end{bmatrix}$$

TABLE 5

(16, 5) Generating Matrix $$G_{16} = \begin{bmatrix} 1 & 1 & 1 & 1 & 1 & 1 & 1 & 1 & 1 & 1 & 1 & 1 & 1 & 1 & 1 & 1 \\ 0 & 0 & 0 & 0 & 0 & 0 & 0 & 0 & 1 & 1 & 1 & 1 & 1 & 1 & 1 & 1 \\ 0 & 0 & 0 & 0 & 1 & 1 & 1 & 1 & 0 & 0 & 0 & 0 & 1 & 1 & 1 & 1 \\ 0 & 0 & 1 & 1 & 0 & 0 & 1 & 1 & 0 & 0 & 1 & 1 & 0 & 0 & 1 & 1 \\ 0 & 1 & 0 & 1 & 0 & 1 & 0 & 1 & 0 & 1 & 0 & 1 & 0 & 1 & 0 & 1 \end{bmatrix}$$

Referring to the permuter 102 where the information bits are permuted, a correlation or relationship exists between the permuted generating matrix and original generating matrix if the generating matrix of the first order RM code is column-permuted and row-permuted. The original RM decoding can be utilized in deriving the originally transmitted data. Using the transformer 112 such as a fast Hadamard transformer, the decoded message word is derived in the ML decoder 113 by depermuting the received code word. For instance, if (0, 1) is modulated to (+1, −1), the Hadamard decoding algorithm for the ($2^m$, m+1) first order RM code includes the following three steps:

(1) For the receiving vector $r^T_{(2^m,1)}$, compute the Hadamard Transform $F^T_{(2^m,1)} = H_{(2^m,2^m)} r^T_{(2^m,1)}$, where $H_{(2^m,2^m)}$ is the Hadamard Matrix.

(2) Find the coordinate a=[$a_m\ a_{m-1}\ \ldots\ a_1$] where $F_a$ has great absolute value.

(3) If $F_a$ is positive, the decoded message is [0 $a_m\ a_{m-1}\ \ldots\ a_1$]. If $F_a$ is negative, the decoded message is [1 $a_m\ a_{m-1}\ \ldots\ a_1$]

In the case of the (16, 5) generating matrix of the first order RM code, if $C_9$=[0101010110101010] is transmitted with no noise added, $r^T$=[1 −1 1 −1 1 −1 1 −1 1 −1 1 −1 1 −1 1 −1 1 −1 1] is received. The Hadamard Transform of $r^T$ will be $F^T_{(16,1)} = H_{(16,16)} r^T_{(16,1)}$=[0 0 0 0 0 0 0 0 16 0 0 0 0 0 0 0], the coordinate a=[1001], where $F_{9=[1\ 0\ 0\ 1]}$ includes a large absolute value. Since $F_{9=[1\ 0\ 0\ 1]}$ is positive, the decoded message is [01001].

An advantage of the present invention is the optimal reduction of the search space required in matching the possible sets of the code words for the data being transmitted. In WCDMA, the TFCI information bits are protected by the Reed-Muller codes. In the split mode, 5 TFCI message bits are encoded to code word of 16 bits by the (16, 5) generating matrix of the first order Reed-Muller code. In the normal mode, 10 TFCI information bits are encoded to a code word of 32 bits. The first 6 bits of the TFCI information bits are encoded using the (32, 6) generating matrix of the first order Reed-Muller code, whereas the last 4 bits are encoded using 4 masks. However, in most applications, the last 4 bits are all zero, and thus, the 4 additional masks will not be used. Further according to the specification of WCDMA, the generating matrices of (16, 5) and (32, 6) Reed-Muller codes are column-permuted and row-permuted, where certain information is given. For example, in the normal mode, 10 TFCI information bits [$a_0\ a_1\ a_2\ a_3\ a_4\ a_5\ a_6\ a_7\ a_8\ a_9$] will represent [0000000000]~[1111111111] corresponding to TFCI=0~1023. However, not all these 1024 possible code words can be used, where, in most cases, only 8~128 are actually used. If only k of the 1024 TFCI information bits are used, the 10 TFCI message bits range from 0 to k−1. The number of possible code words k for the data being transmitted will be 8 to 128, corresponding to TFCI=0~k−1.

Referring to Table 2 in particular, for the (32, 10) TFCI generating matrix, 10 information bits represent TFCI=0~TFCI=1023. Not all 1024 possible code words are sent. If k is 64, the last 4 bits of 10 information bits will be zero, advantageously conserving the search space required.

An additional advantage of the present invention is that the RM decoding complexity is and optimized by reducing the order of the fast Hadamard transform in the transformer 112, provided that the search space satisfies certain criterion (described in further detail herein). Since the number of possible code words k is known, the order of Hadamard transform can be further reduced.

Figure 3:
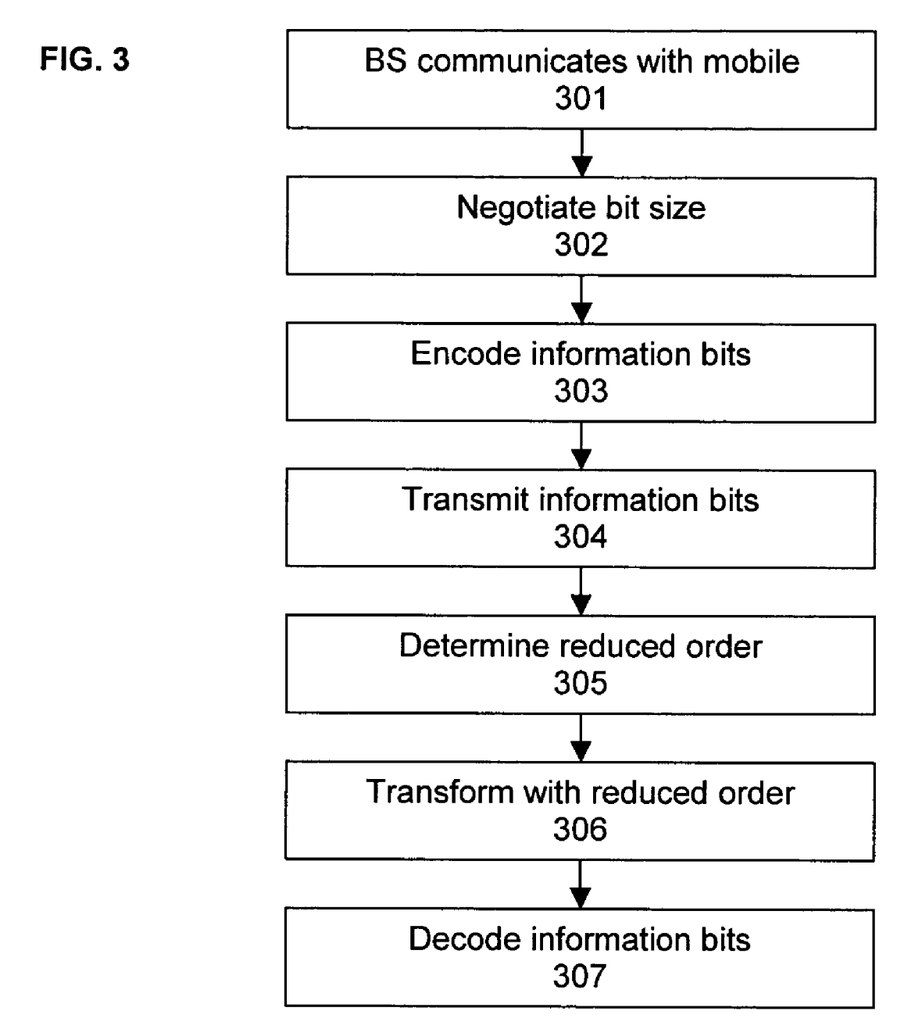
FIG. 3 is a flow diagram exemplarily illustrating a communications method in accordance with another embodiment of the present invention.

FIG. 3 is a flow diagram exemplarily illustrating a communications method in accordance with another embodiment of the present invention. Referring to FIG. 3, a particular embodiment of the communications primarily comprises the steps of communicating between a base station and a mobile unit (step 301), negotiating a size of information bits between the base station and the mobile unit (step 302), encoding the information bits according to a code (step 303), transmitting the encoded information bits with the negotiated size (step 304), transforming the encoded information bits (step 306) with a reduced order determined according to the negotiated size (step 305), and decoding the transmitted information bits (step 307).

In one aspect, the communications method according to the invention utilizes maximum likelihood (ML) decoding (e.g., step 307), which further comprises the steps of generating correlation values for the transformed information bits, calculating at least one maximum value from the generated correlation values, and regenerating the negotiated size (originally negotiated in step 302) from the at least one maximum value.

In an additional aspect, the communications method according to the invention further comprises the steps of permuting the information bits and depermuting the transmitted information bits. In a further aspect, the communications method according to the invention is implemented in wideband code division multiple access or WCDMA.

In another aspect, the information bits are encoded according to Reed-Muller codes (e.g., step 303). In still another aspect, the negotiated size for the information bits further comprises a transport format combination index (TFCI) (e.g., step 302). In yet another aspect, the transmitted information bits are transformed with the reduced order using fast Hadamard transform (e.g., steps 305 and 306).

Also in accordance with a further embodiment of the present invention, there is provided a communications method in WCDMA comprising the steps of communicating between a base station and a mobile unit (step 301), negotiating a size of information bits (namely, transport format combination index or TFCI) between the base station and the mobile unit (step 302), encoding the information bits according to Reed-Muller codes (step 303), permuting the encoded information bits, transmitting the encoded information bits with the negotiated size (step 304), depermuting the transmitted information bits, determining a reduced order according to the negotiated size and a reduced search space (step 305), transforming the encoded information bits (i.e., fast Hadamard transform) with the reduced order and the reduced search space (step 306), and decoding the transmitted information bits (step 307). In one aspect, the communications method according to the invention utilizes maximum likelihood (ML) decoding (e.g., step 307), which further comprises the steps of generating correlation values for the transformed information bits, calculating at least one maximum value from the generated correlation values, and regenerating the negotiated size (originally negotiated in step 302) from the at least one maximum value.

Figure 4:
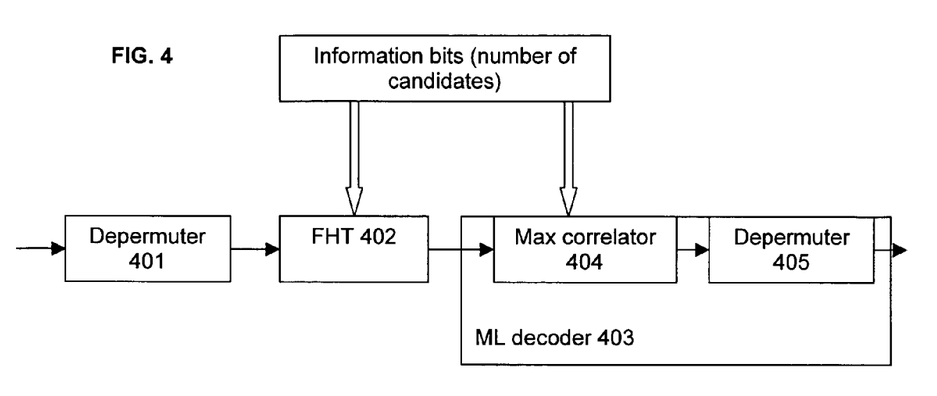
FIG. 4 is an exemplary decoder in a communications system according to still another embodiment of the present invention.

FIG. 4 is an exemplary decoder in a communications system according to still another preferred embodiment of the present invention. Referring to FIG. 4, a decoder is provided in a wideband code division multiple access (WCDMA) system having an encoder encoding information bits for transmission between a base station and a mobile unit. The decoder according to this particular embodiment of the present invention primarily comprises a transport format combination index (TFCI) size negotiated for the encoded information bits for transmission between the base station and the mobile unit, a depermuter 401 depermuting the transmitted information bits, a fast Hadamard transformer 402 transforming the depermuted information bits with a reduced order determined according to the negotiated TFCI size, and a maximum likelihood (ML) decoder 403 decoding the transmitted information bits. In one aspect, the ML decoder 403 further comprises a maximum value correlator 404, in conjunction with the additional depermuter 405, that generates correlation values for the transformed information bits, calculates at least one maximum value from the generated correlation values, and regenerates the TFCI negotiated size from the at least one maximum value.

Figure 5:
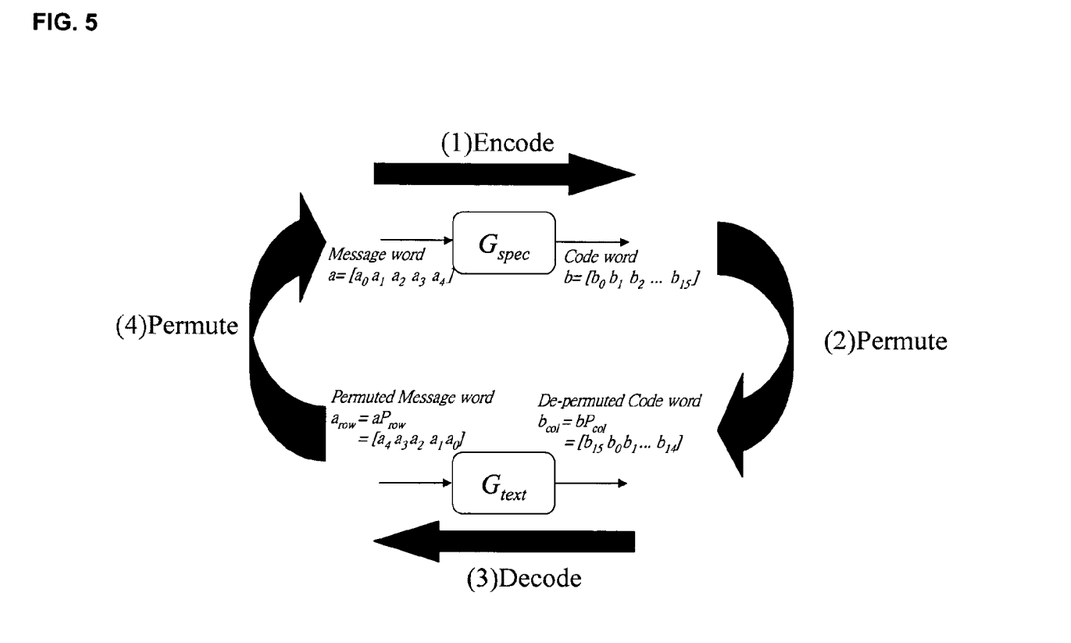
FIGS. 5 and 6 are block diagrams illustrating Reed-Muller encoding and decoding with exemplary generating matrices according to the present invention.
Figure 6:
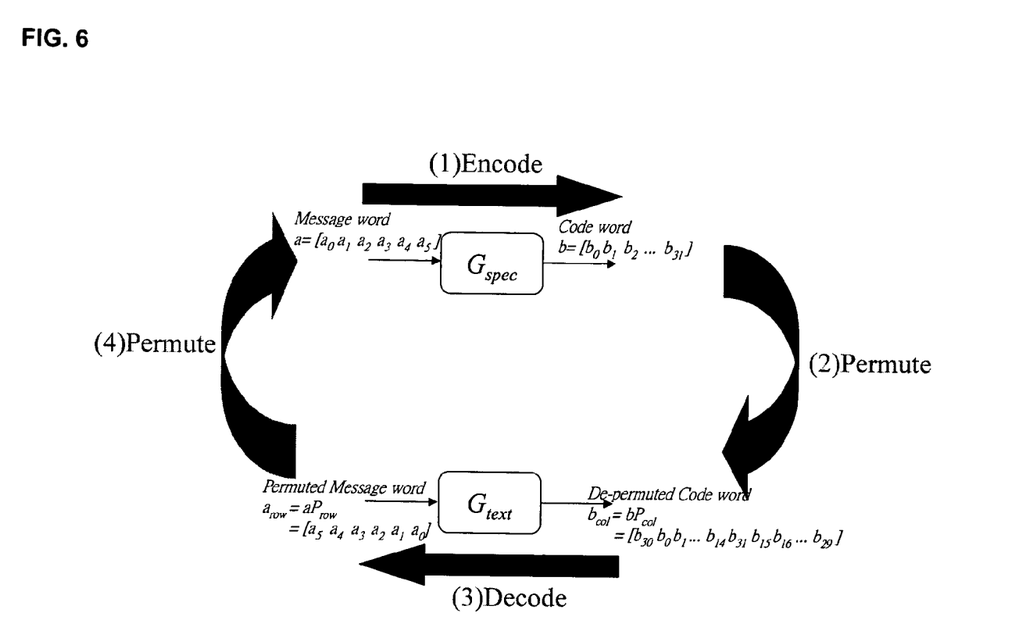

FIGS. 5 and 6 are block diagrams illustrating Reed-Muller encoding and decoding with exemplary matrices according to the present invention. In WCDMA, the TFCI information bits are known prior to decoding, which are protected by RM coding. If the generating matrix in RM coding is row-permuted and column-permuted, a correlation or relationship exists between the generating matrix in the WCDMA specification ($G_{spec}$) and in Reed-Muller (RM) code in the art ($G_{text}$). Two permutation matrices $P_{row}$ and $P_{col}$ are derived with corresponding row and column permutation. Depermutation is then performed in eliminating the difference between the two generating matrices $G_{spec}$ and $G_{text}$.

Referring to FIG. 5 in particular, the RM encoding and decoding of exemplary (16, 5) generating matrices according to the present invention is illustrated. As shown in FIG. 5, in the split mode, the (16, 5) RM code is utilized for TFCI information bit protection. If TFCI information bits (TFCI message=a=$[a_0\ a_1\ a_2\ a_3\ a_4]$) are transmitted, the encoder will encode a=$[a_0\ a_1\ a_2\ a_3\ a_4]$ into TFCI code word b=$[b_0\ b_1\ b_2\ \ldots\ b_{15}]$ with b=a$G_{spec}$. Referring again to Tables 4 and 5 above, the relationship between two generating matrices $G_{spec}$ and $G_{text}$ is as follows:

$$G_{spec} = P_{row} G_{text} P_{col}$$

where row permutation matrix $$P_{row} = \begin{bmatrix} 0 & 0 & 0 & 0 & 1 \\ 0 & 0 & 0 & 1 & 0 \\ 0 & 0 & 1 & 0 & 0 \\ 0 & 1 & 0 & 0 & 0 \\ 1 & 0 & 0 & 0 & 0 \end{bmatrix}$$

and column permutation matrix $$P_{col} = \begin{bmatrix} 0 & 0 & 0 & 0 & 0 & 0 & 0 & 0 & 0 & 0 & 0 & 0 & 0 & 0 & 0 & 1 \\ 1 & 0 & 0 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 & 0 \\ 0 & 0 & 0 & 0 & 0 & 0 & 0 & 1 & 0 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 1 & 0 & 0 & 0 & 0 & 0 & 0 \\ 0 & 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 0 & 0 & 1 & 0 \end{bmatrix}$$

As a result, the encoded code word $b=[b_0\ b_1\ b_2\ \ldots\ b_{15}]$ is thus:

$$b = aG_{spec}$$

$$= a(P_{row}^{-1}P_{row})G_{spec}$$

$$= (aP_{row}^{-1})(P_{row}G_{spec})$$

where the inverse row permutation matrix $$P_{row}^{-1} = P_{row}^T = \begin{bmatrix} 0 & 0 & 0 & 0 & 1 \\ 0 & 0 & 0 & 1 & 0 \\ 0 & 0 & 1 & 0 & 0 \\ 0 & 1 & 0 & 0 & 0 \\ 1 & 0 & 0 & 0 & 0 \end{bmatrix}.$$

Then, $$bP_{col} = (aP_{row}^{-1})(P_{row}G_{spec})P_{col}$$

$$= (aP_{row}^{-1})G_{text}$$

In this example, the TFCI message=$a=[a_0\ a_1\ a_2\ a_3\ a_4]$ is encoded into the TFCI code word=$b=[b_0\ b_1\ b_2\ \ldots\ b_{15}]$ by the generating matrix $G_{spec}$. In the same token, the Permuted TFCI message=$aP_{row}^{-1}=[a_0\ a_1\ a_2\ a_3\ a_4]$ is encoded into the Permuted TFCI code word=$bP_{col}=[b_0\ b_1\ b_2\ \ldots\ b_{15}]$ by the generating matrix $G_{text}$. For this particular (16, 5) RM code, as the receiving vector $r=[r_0\ r_1\ r_2\ \ldots\ r_{15}]$ is received, r is depermuted into $r'=rP_{col}=[r_{15}\ r_0\ r_1\ \ldots\ r_{14}]$. The RM decoder is then utilized in deriving the Permuted TFCI decoded message $m'=[m_4\ m_3\ m_2\ m_1\ m_0]$, resulting in the final decoded TFCI information bits, i.e., $m=m'P_{row}=[m_0\ m_1\ m_2\ m_3\ m_4]$.

Referring to FIG. 5 in particular, the RM encoding and decoding of exemplary (32, 6) generating matrices according to the present invention is illustrated. For the (32, 6) RM code, as the receiving vector is $r=[r_0\ r_1\ r_2\ \ldots\ r_{31}]$ received, r is depermuted into $r'=rP_{col}=[r_{30}\ r_0\ r_1\ \ldots\ r_{14}\ r_{31}\ r_{15}\ r_{16}\ \ldots\ r_{29}]$. The RM decoder is then utilized to derive the permuted TFCI decoded message $m'=[m_5\ m_4\ m_3\ m_2\ m_1\ m_0]$, resulting in the final decoded TFCI information bits $m=m'P_{row}=[m_0\ m_1\ m_2\ m_3\ m_4\ m_5]$. A particular advantage of the present invention lies in the fact that, despite the size of the first order RM code and the manner by which the generating matrix is row-permuted and column-permuted, the corresponding permutation matrix is readily derived by depermutation.

Referring to the fast Hadamard transformer 402 with order reduction in particular, there are $2^{m+1}$ possible messages from $[000\ \ldots\ 0]$ to $[111\ \ldots\ 1]$ for the $(2^m, m+1)$ RM code. For the RM decoding, as $r=[r_0\ r_1\ r_2\ \ldots\ r_{2^m-1}]$ is received a $2^m$-point Hadamard transform is required:

$$\begin{bmatrix} Cor_0 \\ Cor_1 \\ Cor_2 \\ \vdots \\ \vdots \\ \vdots \\ Cor_{2^m-1} \end{bmatrix} = \begin{bmatrix} -Cor_{2^m} \\ -Cor_{2^m+1} \\ -Cor_{2^m+2} \\ \vdots \\ \vdots \\ \vdots \\ -Cor_{2^{m+1}-1} \end{bmatrix} = H_{2^m \times 2^m} \begin{bmatrix} r_0 \\ r_1 \\ r_2 \\ \vdots \\ \vdots \\ \vdots \\ r_{2^m-1} \end{bmatrix}$$

If the number of candidates in the data being transmitted is less than or equal to $2^{m-1}$, and range from $[000\ \ldots\ 0]$ to $[001\ \ldots\ 1]$, the order of Hadamard transform can be reduced to $2^{m-1}$ points. In contrast, without order reduction, $2^{m+1}$ correlation values ($Cor_0, Cor_1, Cor_2, \ldots, Cor_{2^{m+1}-1}$) between the receiving vector and all $2^{m+1}$ possible code words are derived after a $2^m$-point Hadamard transform. If the number of candidates in the data being transmitted is less than or equal to $2^{m-1}$, the first $2^{m-1}$ correlation values ($Cor_0, Cor_1, Cor_2, \ldots, Cor_{2^{m-1}-1}$) are essential. Thus, $r=[r_0\ r_1\ r_2\ \ldots\ r_{2^m-1}]$ can be combined into $r'=[r_0+r_{2^{m-1}}\ r_1+r_{2^{m-1}+1}\ r_2+r_{2^{m-1}+2}\ \ldots\ r_{2^{m-1}-1}+r_{2^m-1}]$, where the $2^{m-1}$-point Hadamard transform is performed. Using an (8, 4) RM code as an example, the RM decoding, without order reduction, requires an 8-point Hadamard transform:

$$\begin{bmatrix} Cor_0 \\ Cor_1 \\ Cor_2 \\ Cor_3 \\ Cor_4 \\ Cor_5 \\ Cor_6 \\ Cor_7 \end{bmatrix} = \begin{bmatrix} -Cor_8 \\ -Cor_9 \\ -Cor_{10} \\ -Cor_{11} \\ -Cor_{12} \\ -Cor_{13} \\ -Cor_{14} \\ -Cor_{15} \end{bmatrix} = \begin{bmatrix} + & + & + & + & + & + & + & + \\ + & - & + & - & + & - & + & - \\ + & + & - & - & + & + & - & - \\ + & - & - & + & + & - & - & + \\ + & + & + & + & - & - & - & - \\ + & - & + & - & - & + & - & + \\ + & + & - & - & - & - & + & + \\ + & - & - & + & - & + & + & - \end{bmatrix} \begin{bmatrix} r_0 \\ r_1 \\ r_2 \\ r_3 \\ r_4 \\ r_5 \\ r_6 \\ r_7 \end{bmatrix}$$

If the number of candidates for the data being transmitted is less than or equal to 4, only $Cor_0$–$Cor_3$ are needed. Thus, with order reduction according to the present invention $r_0$ and $r_4$, $r_1$ and $r_5$, $r_2$ and $r_6$, $r_3$ and $r_7$ are combined. A reduced 4-point Hadamard transform is the required:

$$\begin{bmatrix} Cor_0 \\ Cor_1 \\ Cor_2 \\ Cor_3 \end{bmatrix} = \begin{bmatrix} + & + & + & + \\ + & - & + & - \\ + & + & - & - \\ + & - & - & + \end{bmatrix} \begin{bmatrix} r_0+r_4 \\ r_1+r_5 \\ r_2+r_6 \\ r_3+r_7 \end{bmatrix}$$

If the number of candidate for the data being transmitted is less than or equal to $2^{m-i}$, the receiving values can be further combined with a $2^{m-i}$-point Hadamard transform.

Referring to the maximum likelihood (ML) decoder 403 and the maximum value correlator 404 (also known as the maximum correlation index searcher) in particular, the search space is advantageously reduced in matching the number of candidates for the data being transmitted. In accordance with ML decoding, the code word having the maximum correlation is selected from all possible code words received. All correlation values are shown in a resulting vector after the fast Hadamard transform in the transformer 402. For the $(2^m,$ m+1) RM code, if $2^m<k<2^{m+1}$ where the number of candidates for the data being transmitted is k with a range from 0 to k−1, the correlation vector output from the Hadamard transform into two parts. The first or upper part includes $k-2^m$ values corresponding to $Cor_0$~$Cor_{k-2^m-1}$. The second or lower part includes $2^{m+1}-k$ values corresponding to $C_{k-2^m}$~$C_{2^m-1}$. The absolute value is compared with the current maximum for the upper part $k-2^m$. The original values are compared for the lower part $2^{m+1}-k$. If $k \leqq 2^m$, a $2^i$-point Hadamard transform is performed at an order where i satisfies $2^{i-1}<k \leqq 2^i$. The correlation vector having a size $2^i$ is derived after the $2^i$-point Hadamard transform. The correlation vector is then separated into two parts. The first or upper part includes k values corresponding to $Cor_0$~$Cor_{k-1}$. The second or lower part includes $2^i-k$ values corresponding to $C_k$~$C_{2^i-1}$. The original values are compared with the current maxima for the upper part k, whereas the lower part $2^i-k$ is ignored. The search space in matching the number of candidates is thus advantageously reduced in optimizing transmission performance.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A communications method, comprising:
communicating between a base station and a mobile unit;
negotiating a number of transport format combination index (TFCI) information bits included in a packet between the base station and the mobile unit;
encoding the information bits according to a code;
transmitting the encoded TFCI information bits with the negotiated number between the base station and the mobile unit;
transforming the transmitted TFCI information bits with a reduced order determined according to the negotiated number; and
decoding the transformed TFCI information bits.

2. The method of claim 1 further comprising:
generating correlation values for the transformed TFCI information bits;
calculating at least one maximum value from the generated correlation values; and
regenerating the negotiated number from the at least one maximum value.

3. The method of claim 1 further comprising permuting the TFCI information bits and depermuting the transmitted TFCI information bits.

4. The method of claim 1 wherein the transmitted TFCI information bits are transformed with the reduced order using fast Hadamard transform.

5. The method of claim 1 wherein the TFCI information bits are encoded according to Reed-Müller codes.

6. The method of claim 1 wherein the method is implemented in wideband code division multiple access (WCDMA).

7. A communications method, comprising:
communicating between a base station and a mobile unit;
negotiating a number of transport format combination index (TFCI) information bits included in a packet between the base station and the mobile unit;
encoding the TFCI information bits according to Reed-Müller codes;
permuting the encoded TFCI information bits;
transmitting the encoded TFCI information bits with the negotiated number between the base station and the mobile unit;
depermuting the transmitted TFCI information bits;
determining a reduced order according to the negotiated number and a reduced search space;
transforming the depermuted TFCI information bits with the reduced order and the reduced search space; and
decoding the transformed TFCI information bits.

8. The method of claim 7 further comprising:
generating correlation values for the transformed TFCI information bits;
calculating at least one maximum value from the generated correlation values; and
regenerating the negotiated number from the at least one maximum value.

9. The method of claim 7 wherein the transmitted TFCI information bits are transformed with the reduced order using fast Hadamard transform.

10. The method of claim 7 wherein the method is implemented in wideband code division multiple access (WCDMA).

11. A wideband code division multiple access (WCDMA) system, comprising:
a base station;
a mobile unit, wherein a number of transport format combination index (TFCI) information bits included in a packet is negotiated between the base station and the mobile unit;
an encoder encoding the TFCI information bits, wherein the encoded TFCI information bits are transmitted between the base station and the mobile unit with the negotiated number;
a transformer transforming the transmitted TFCI information bits with a reduced order determined according to the negotiated number and a reduced search space; and
a maximum likelihood (ML) decoder decoding the transformed TFCI information bits.

12. The system of claim 11 further comprising:
a permuter permuting the encoded TFCI information bits; and
a depermuter depermuting the transmitted TFCI information bits.

13. The system of claim 11 wherein the ML decoder generates correlation values for the transformed TFCI information bits, calculates at least one maximum value from the generated correlation values, and regenerates the negotiated number from the at least one maximum value.

14. The system of claim 11, the transformer further comprising a fast Hadamard transformer.

15. The system of claim 11, wherein the encoder encodes according to Reed-Müller codes.

16. A decoder in a communications system having an encoder encoding information bits for transmission between a base station and a mobile unit, the decoder comprising:
a transport format combination index (TFCI) size negotiated for the encoded information bits for transmission between the base station and the mobile unit;
a depermuter depermuting the transmitted information bits;
a fast Hadamard transformer transforming the depermuted information bits with a reduced order determined according to the negotiated TFCI size; and
a maximum likelihood (ML) decoder decoding the transmitted information bits.

17. The decoder of claim 16 wherein the ML decoder generates correlation values for the transformed information bits, calculates at least one maximum value from the generated correlation values, and regenerates the TFCI negotiated size from the at least one maximum value.

18. The decoder of claim 16 wherein the communications system is a wideband code division multiple access (WCDMA) system.

* * * * *

UNITED STATES PATENT AND TRADEMARK OFFICE
CERTIFICATE OF CORRECTION

| | |
|---|---|
| PATENT NO. | : 7,463,689 B2 |
| APPLICATION NO. | : 10/681164 |
| DATED | : December 9, 2008 |
| INVENTOR(S) | : Shin-Lin Shieh et al. |

It is certified that error appears in the above-identified patent and that said Letters Patent is hereby corrected as shown below:

On the title page, item (75), line 1, "Fujan (CN)" should read --Kinmen County, Fujian, (TW)--

Signed and Sealed this

Eleventh Day of May, 2010

David J. Kappos
*Director of the United States Patent and Trademark Office*